United States Patent [19]
Wood et al.

[11] 4,047,147
[45] Sept. 6, 1977

[54] DUAL BEAM SONAR DISPLAY SYSTEM

[75] Inventors: Kenneth E. Wood; James T. O'Farrell, both of Annapolis, Md.

[73] Assignee: Westinghouse Electric Corporation, Pittsburgh, Pa.

[21] Appl. No.: 710,969

[22] Filed: Aug. 2, 1976

[51] Int. Cl.² ............................ G01S 9/68; G01S 7/62
[52] U.S. Cl. ................................. 340/3 R; 340/3 C; 343/5 SC
[58] Field of Search .............. 340/3 C, 3 R; 343/5 SC

[56] References Cited
U.S. PATENT DOCUMENTS

| | | | |
|---|---|---|---|
| 3,914,730 | 10/1975 | Jones et al. | 340/3 R |
| 4,003,015 | 1/1977 | Pipkin | 340/3 R |

*Primary Examiner*—Richard A. Farley
*Attorney, Agent, or Firm*—D. Schron

[57] ABSTRACT

Docking sonar uses first and second fan-shaped beams sequentially scanning a target zone in mutually perpendicular directions. Target returns from one beam scan are compared with target returns from the other beam scan and the results are placed into a storage medium such as a video disc and then displayed on a conventional TV monitor, with brightness of the target on the display being an indication of target range.

14 Claims, 9 Drawing Figures

Figure 1:
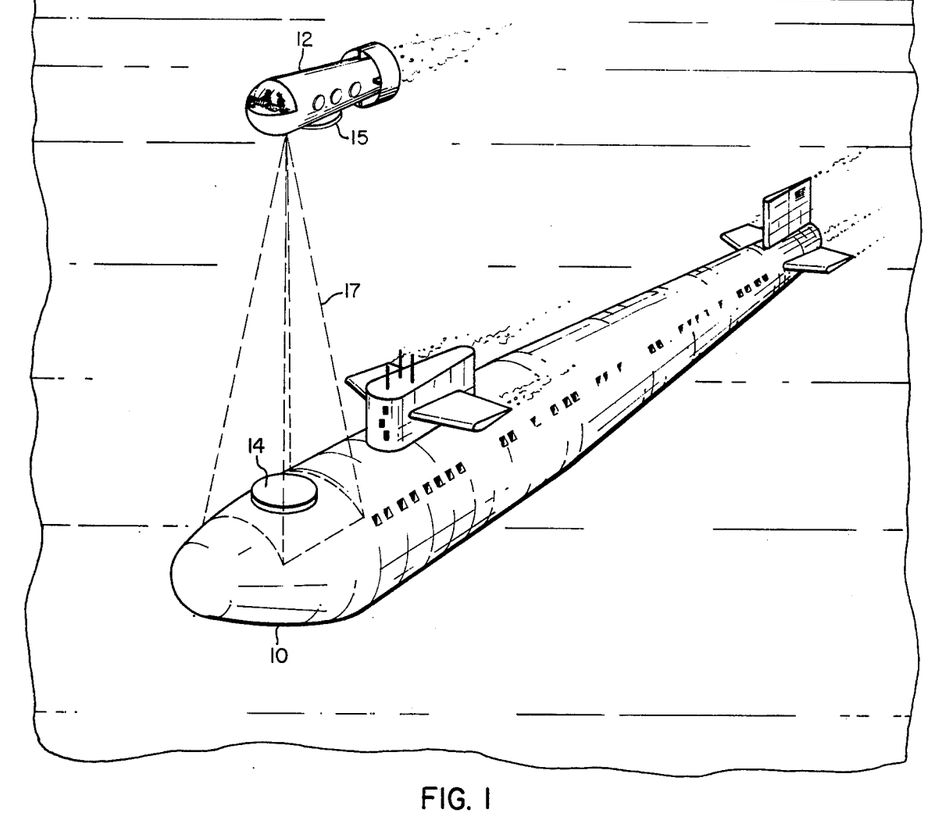
FIG. 1 illustrates a typical docking operation in which the present invention may be utilized.

FIG. 9 ered by submersible 12 examines the target zone of interest and will portray it on a display so that an operator may maneuver the submersible into cooperative engagement.

DUAL BEAM SONAR DISPLAY SYSTEM

BACKGROUND OF THE INVENTION

1. Field of the Invention

The invention in general relates to sonar systems and particularly to a dual beam system and display therefor.

2. Description of the Prior Art

For some underwater operations, a situation arises wherein a small submersible is to dock or mate with another structure for transfer of personnel and/or material.

The docking area is acquired by a sonar system and is portrayed on a display within the submersible so that the operator can maneuver to a close enough distance so that mating can occur either visually or with high resolution television. The present invention provides a relatively inexpensive system which will accomplish the desired target acquisition and will display the target area on a conventional TV monitor.

SUMMARY OF THE INVENTION

The apparatus includes a sonar which produces a first fan-shaped beam which scans the target zone in a first direction and provides a first set of beam signals indicative of targets in respective adjacent beam positions. During this scan, target indications are placed into storage. The sonar then forms a fan-shaped beam which overlaps the previous beam and scans in a second direction to provide a second set of beam signals. Means are provided for comparing each signal of the second set with every signal of the first set for target coincidence and the results of the comparison are placed into another storage device. The stored signals are then placed into storage for the assembly of a TV picture for presentation on a TV monitor.

DESCRIPTION OF THE PREFERRED EMBODIMENT

FIG. 1 illustrates an operational situation wherein a submarine 10 is in position to receive a small submersible 12 by cooperative engagement of respective mating hatches 14 and 15. The field of view 17 of a sonar carried by submersible 12 examines the target zone of interest and will portray it on a display so that an operator may maneuver the submersible into cooperative engagement.

Figure 2:
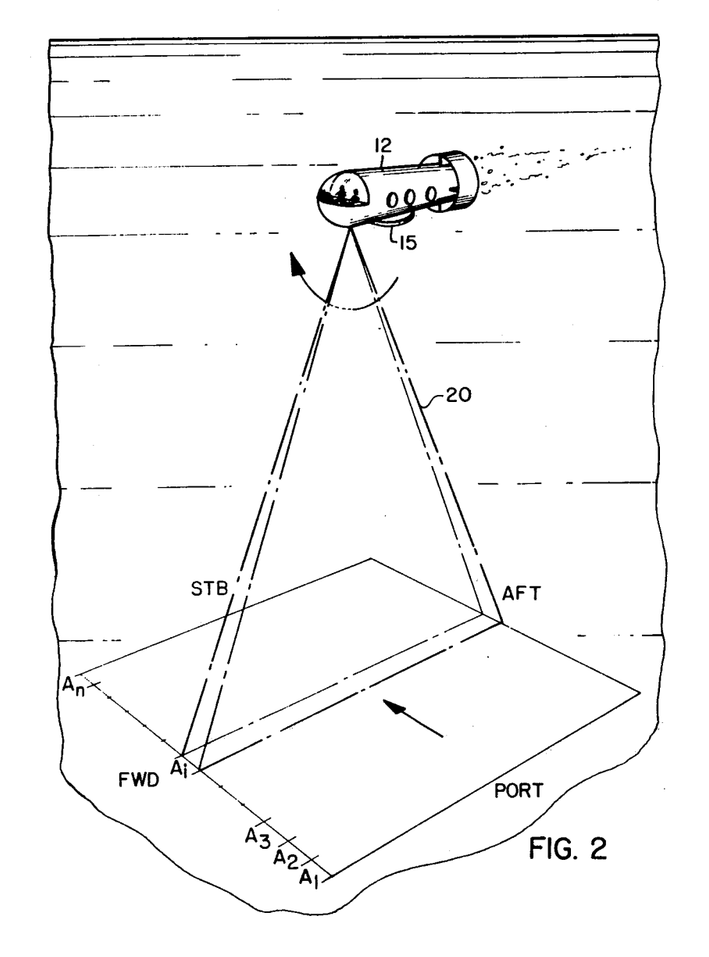
FIG. 2 illustrates the scanning of a fan-shaped beam in the port to starboard direction.

In the present invention, the sonar forms and scans in sequential order first and second fan-shaped beams in overlapping relationship, in respective first and second directions. For example FIG. 2 illustrates a first fan-shaped beam 20 being scanned from a port to starboard direction. This first beam, which is herein termed the A sonar beam is indexed so as to receive target indications from adjacent beam positions $A_1$ through $A_n$. FIG. 2 shows the beam at position $Ai$. In operation, range is quantized into range cells or increments, and the sonar design is such that the first target return above a predetermined threshold will be provided as the target indication for that beam and the time occurrence of which after a transmit is indicative of a particular range increment.

Figure 3:
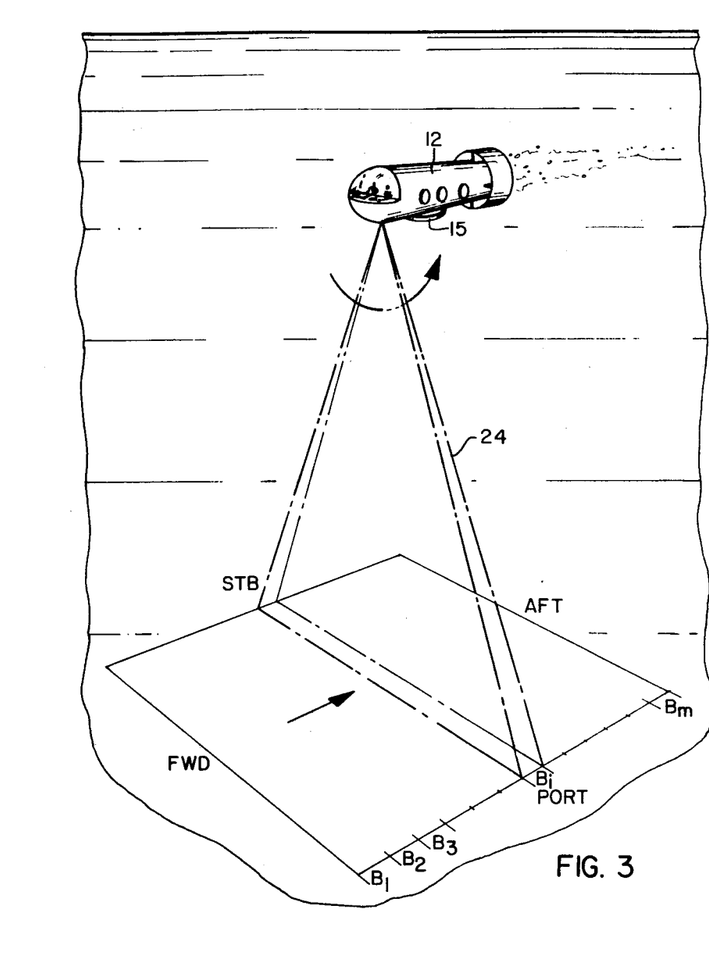
FIG. 3 illustrates the scanning in a forward to aft direction.

In a similar manner, and as illustrated in FIG. 3, a second beam 24, herein termed the B sonar beam, is scanned from a forward to aft direction and is indexed through beam positions $B_1$ through $B_m$.

Figure 4:
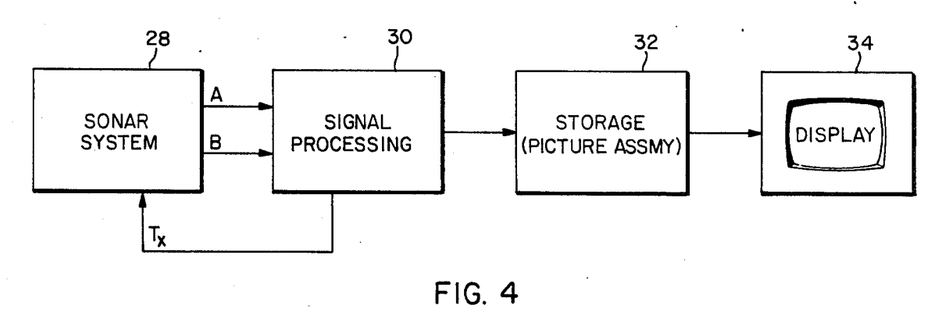
FIG. 4 is a block diagram of the overall system.

FIG. 4 illustrates a block diagram of the apparatus and includes the sonar system 28 which produces the first and second scanning beams and presents a first set of beam signals from the A sonar and a second set of beam signals from the B sonar to signal processing circuit 30 where the signals are compared for coincidence and the results of the comparison are provided to a storage 32 where the signals for a television picture are assembled for presentation to a TV monitor display 34.

If desired, the transmission of acoustic energy may be controlled by the signal processing circuit 30 as will be demonstrated with respect to FIG. 4 to which reference is now made.

For purposes of explanation, let it be assumed that the TV monitor display is a conventional commercially available monitor operating on a 525 line, 2:1 interlace, 30 frames, and 60 fields per second, standard. The number of beam positions, $n$, in the port to starboard direction will be 256, and although the number of beam positions, $m$, in the forward to aft direction may also be 256, in the one embodiment to be described, less than 256 beams will be displayed. By way of example 224 beams will be displayed plus 16 lines for a gray scale reference, thus, filling the number of active lines in one field, To provide a 2:1 interlaced picture the same data will be displayed on both fields.

Figure 5:
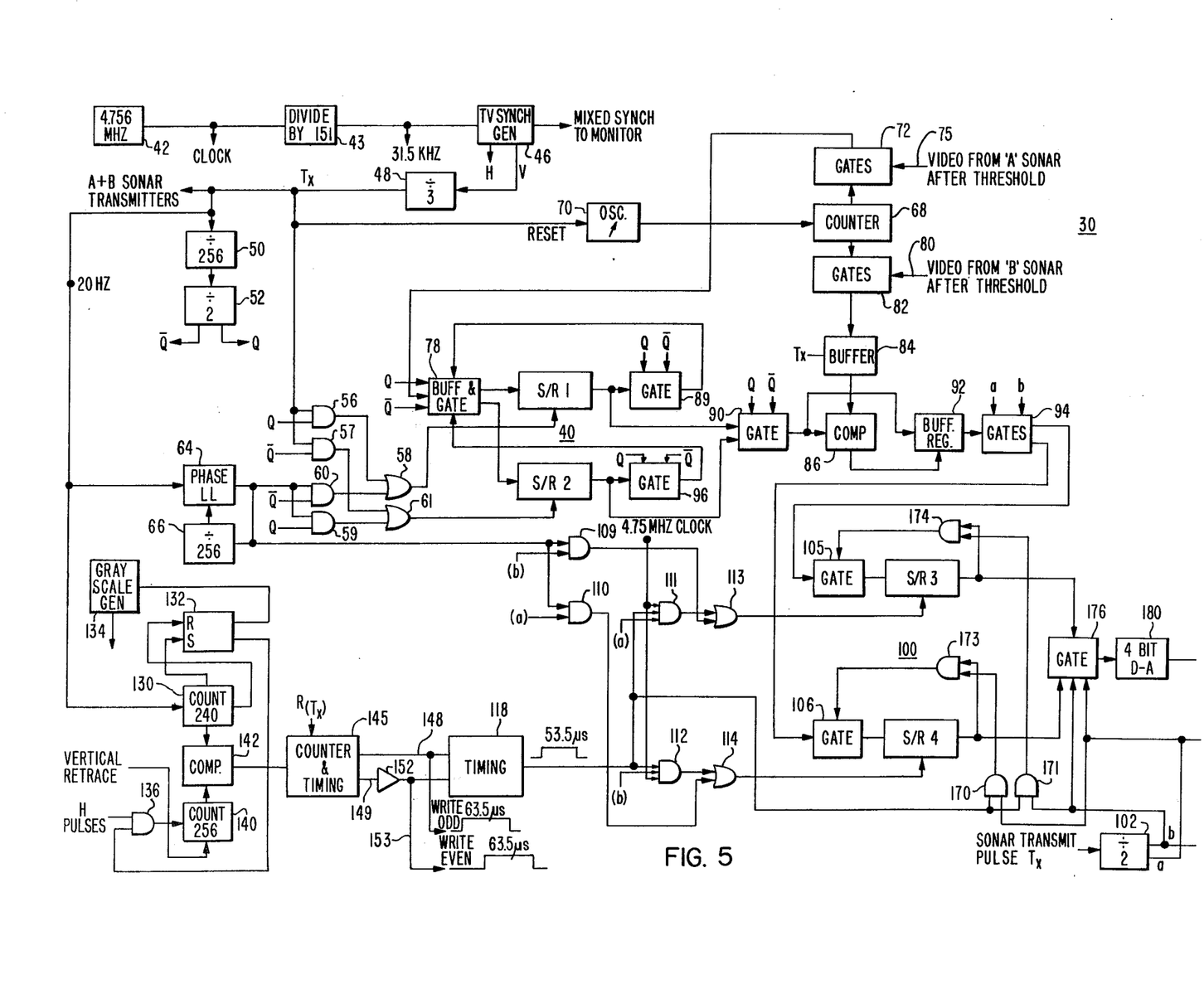
FIG. 5 is a block diagram showing the signal processing circuit of FIG. 4 in greater detail.

FIG. 5 illustrates in block diagram form one embodiment of signal processing circuit 30. The fan-shaped beam of the port to starboard A sonar is indexed for 256 positions in its sweep. The sonar returns from the beam positions are quantized into R range increments and any return above a predetermined threshold value is then established as being in one of the range increments and by way of example if R is 100 the range increment can be described by a 7-bit digital word. At the end of the sweep, 256 7-bit words are stored in a memory designated as storage 40 which includes by way of example, a shift register S/R 1.

Once the results of the sweep have been stored, they are compared with the forward-aft sonar beam sweep. However, in order to speed up operation, while this comparison is being made another port-starboard sweep may be concurrently made (although at a different sonar frequency) and placed into storage for the next comparison. Accordingly, storage 40 includes S/R 2, with S/R 1 and S/R 2 each being able to accommodate 256 7-bit words.

Although not essential, it is convenient to lock the sonar timing to the TV display and for the present example, the sonar transmit interval will be an exact number of TV fields. In order to display the sonar data over the active portion of the TV picture, the total TV line is divided into 302 increments, the first 46 of which correspond to horizontal retrace, thereby leaving 256 for the display of 256 beams. The system is timed from a master clock 42 illustrated in the upper left-hand corner of FIG. 5 and having a frequency of 4.756 megahertz. Divider circuit 43 is responsive to the clock signal to provide a 31.5 kilohertz signal to TV synch generator 46. This TV synch generator is a standard piece of apparatus which provides the mixed synch to the TV monitor and is also operable to provide a horizontal line signal H and a vertical field retrace signal V.

Since the sonar transit is an exact number of TV fields, divider circuit 48 is responsive to the vertical retrace signal V to provide a sonar transmit signal $T_x$ after, for example three fields, the sonar transmit rate thereby being 20 hertz. Since there are 256 beam positions, each representing a different sonar transmission, there is provided a divider circuit 50 which counts up the number of transmissions and provides, after 256 of them, an output signal to toggle flip-flop 52 the alternate states of which govern into which shift register S/R 1 or S/R 2 data will be inserted and extracted.

For one transmission, one of the shift registers for example S/R 1, will be entering the results of each transmission from sonar A, while S/R A, while S/R 2 will be utilized to compare its contents in all of its locations with each beam from the B sonar transmission. Accordingly the clocking rate for S/R 2 is 256 times higher than that of S/R 1, and for the next comparison the roles will be reversed. The circuitry for providing the shift registers with the proper clocking pulses include a series of gates 56 to 61 and a phase locked loop circuit 64 which is responsive to the basic sonar transmission frequency, and an output from divider circuit 66 to provide a signal of 5120 hertz, that is, a frequency which is 256 times the transmission frequency.

When the Q output from toggle flip-flop is high, gates 56 and 59 are enabled such that the basic sonar transmission frequency received by gate 56 is passed through gate 58 to S/R 1 while the higher frequency from phase locked loop 64 is passed through gates 59 and 61 to S/R 2. After 256 transmissions, the toggle flip-flop 52 will switch states such that $\overline{Q}$ will be high and gate 57 will pass the basic sonar frequency through a gate 61 and S/R 2, while the higher frequency will be provided by gates 60 and 58 to S/R 1.

In order to store a target indication at a particular range increment for each beam, there is provided a counter 68 which provides a running count of the output of oscillator 70, the period of which is chosen to correspond to one range increment and which is reset upon each transmission. The counter indication is provided to gate 72 but will not pass therethrough until enabled by a sonar return on line 75 from the A sonar. With oscillator 70 adjusted for the speed of sound in water, and for the desired range increments, counter 68 provides a running range count and accordingly any return from a particular range increment will cause that value of range increment from counter 68 to be transferred through gate 72 to buffer and gate circuit 78. This buffer and gate circuit 78 under control of the toggle flip-flop 52, will gate the sonar beam information from the A sonar into S/R 1, for example. Operation is continued with oscillator 70 and counter 68 resetting after each transmission until information from 256 adjacent beams are loaded into S/R 1. Thereafter, when toggle flip-flop 52 provides its alternate output, S/R 2 will receive the target information from the auxiliary A sonar, while the contents of S/R 1 will be clocked at the higher frequency from gate 58 to be compared with each beam from the B sonar.

In a manner similar to the A sonar, the B sonar indication on line 80 enables gate 82 to pass the range increment indication to buffer 84 which in response to each transmission will transfer its contents to a buffer in comparator circuit 86.

Under control of toggle flip-flop 52, gate circuits 89 and 90 are open to S/R 1 so that after each transmission the entire contents of S/R 1 are compared with a first beam from the B sonar and are recirculated through gate 89 and buffer and gate 78 to be placed back into S/R 1 for subsequent comparisons with subsequent B beams. If any of the 256 stored signals, each representing a possible target in a particular range increment is equal to the target indication at that same range increment in the B sonar beam, comparator circuit 86 which performs this comparison will provide an enabling signal to buffer register 92 to pass the results of the comparison, that is, target coincidence (range) of a particular A beam with that particular B beam, through to gate circuit 94.

After 256 transmissions for the B sonar and accordingly after 256 recirculations of S/R 1, toggle flip-flop 52 will change states so that the information previously being stored in S/R 2 will then be compared with the next 256 beams of the B sonar, as governed by gate 90 and gate 96 equal in function to gate 89.

Figure 6:
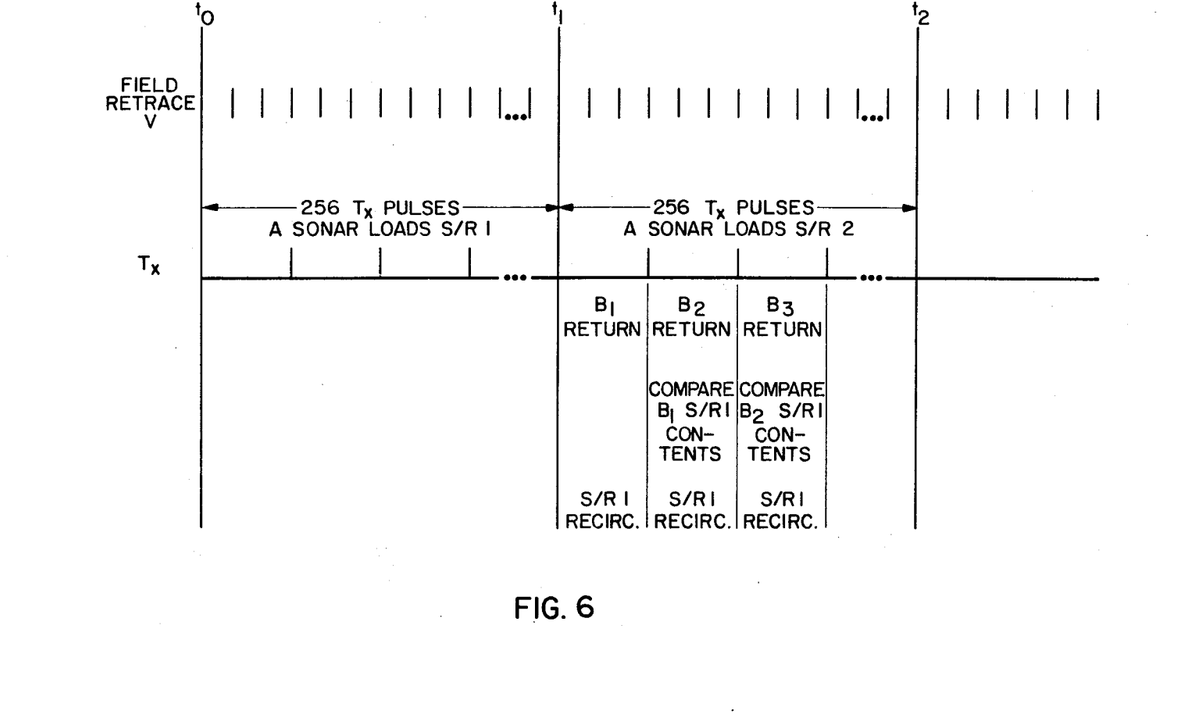
FIGS. 6 and 7 are timing diagrams to aid in the understanding of the operation of the signal processing circuitry.

Timing of the operation thus far described is illustrated in FIG. 6. Between times $t_0$ and $t_1$, there are 256 sonar transmissions, one for each three field retraces, and in which period the A sonar loads S/R 1. Thereafter, from $t_1$ to $t_2$, the A sonar (operating at a sonar frequency different from the B sonar) will load S/R 2. After the first transmission at $t_1$ the first B beam, $B_1$, return comes in. After the second transmission, the $B_2$ return comes in , after the third transmission, the $B_3$ return comes in , etc. Between the second and third transmission the $B_1$ return is compared with the entire contents of S/R 1 while S/R 1 is being recirculated. Between the third and fourth transmissions, B2 is compared with the contents of S/R 1, and S/R 1 is again recirculated. The process is similarly continued at which time beginning at $t_2$ the B returns will be compared with the contents of S/R 2 being loaded during the period from $t_1$ to $t_2$.

Referring once again to FIG. 5, a second storage means 100 is provided for storing the results of the comparison and includes S/R 3 and S/R 4 each with a 256 by 7-bit capacity. toggle flip-flop 102 at the lower right corner of FIG. 5, is responsive to each sonar transmission pulse $T_x$ to provide alternate outputs a and b. Gate 94 is responsive to the a and b outputs for gating the results of the comparison of sonar A and B into S/R 3 and S/R 4 through respective gates 105 and 106.

For the present example, let it be assumed that the storage means for assembly of the picture (32 in FIG. 4) is a standard commercially available video disc machine operating at 3600 rpm and which includes two picture tracks, one for the storage of the odd field and the other for storage of the even field. Reading into S/R 3 or S/R 4 will be at a rate equivalent to the rate of comparison of the A and B sonar returns while reading out will be at a much faster rate compatible with a TV line time. The provision of different clocking pulses to S/R 3 and S/R 4 is under control of toggle flip-flop 102 and a series of gates 109 to 114. When the a signal from toggle flip-flop 102 is high, gate 110 will pass the 5120 hertz signal from phase locked loop 64 through to gate 114 and then to S/R 4 while gate 111 passes the 4.756 megahertz signal from master clock 42 through to gate 113 to clock S/R 3. When the *b* signal from toggle flip-flop 102 is high, gates 109 and 113 will pass the 5120 hertz signal to S/R 3 while gates 112 and 114 will pass the 4.756 megahertz signal through to clock S/R 4.

Although the clock pulses for reading out are provided to gates 111 and 112, they will be provided only for a time duration corresponding to an active portion of a TV line time. This gating is governed by a 53.5 microsecond pulse provided to gate 111 and 112 by timing circuit 118.

On the display, each range increment is illustrated as a different shade of gray to provide some information as to the relative distance of targets. Although not an absolute necessity, it would be convenient to have a gray scale reference right on the tube of the monitor display. Accordingly means are provided for reserving, for example, the first 16 TV lines for presentation of the gray scale reference. The circuitry for accomplishing this includes a counter 130 which is operable to count up the sonar transmissions and provide two output signals one at the count of 16 and the other at the count of 240. Normally, once written on the disc, the gray scale reference will remain indefinitely. If however, a volatile storage such as a solid state storage is used, the gray scale must be rewritten each time after the power is turned on. Accordingly there is provided a gray scale generator 134.

Let it be assumed that the count of 240 has been attained such that an output signal is provided to the R input of flip-flop 132; the corresponding output is utilized to initiate the gray sale generator 134 for presentation on the monitor. After 16 transmissions, counter 130 will provide an output to the S input of flip-flop 132 which will then provide a corresponding enabling signal to gate 136 which will then pass the H signals from TV synch generator 46 through to counter 140.

Counter 140 which is reset by the vertical retrace signal V from TV synch generator 46 provides an indication of its count to comparator circuit 142 which also receives an indication from counter 130 to provide an output signal to counter and timing circuit 145 when there is coincidence. Since gate 136 is not enabled until after 16 transmissions, no count will be transferred to comparator 142 for comparison. After the 16 transmission, and with the frequencies involved, comparator circuit 142 will actually provide three output signals before the next transmission. Counter and timing circuit 145 is responsive to the first indication to provide a 63.5 microsecond write pulse on line 148; is responsive to the second comparison indication to provide a 63.5 microsecond pulse on line 149; and disregards the third indication. For writing on the dual tracks of a 3600 rpm video disc, one field must be displaced by one-half TV line for proper presentation and accordingly a delay circuit 152 is provided so that the signal on line 153 is a 63.5 microsecond pulse delayed relative to the pulse on line 148 by one-half TV line (plus one disc revolution). Operation of this portion of the circuitry is demonstrated by the timing diagram of FIG. 7. The transmission pulses $T_x$ are indicated by numbers $R_{x1}$, $T_{x2}$, . . . . $T_{x16}$, etc., and they occur for every three field retraces, V. There is no output from gate 136 for the first 16 pulses and thereafter output pulses occur at the TV line rate (H).

Figure 7:
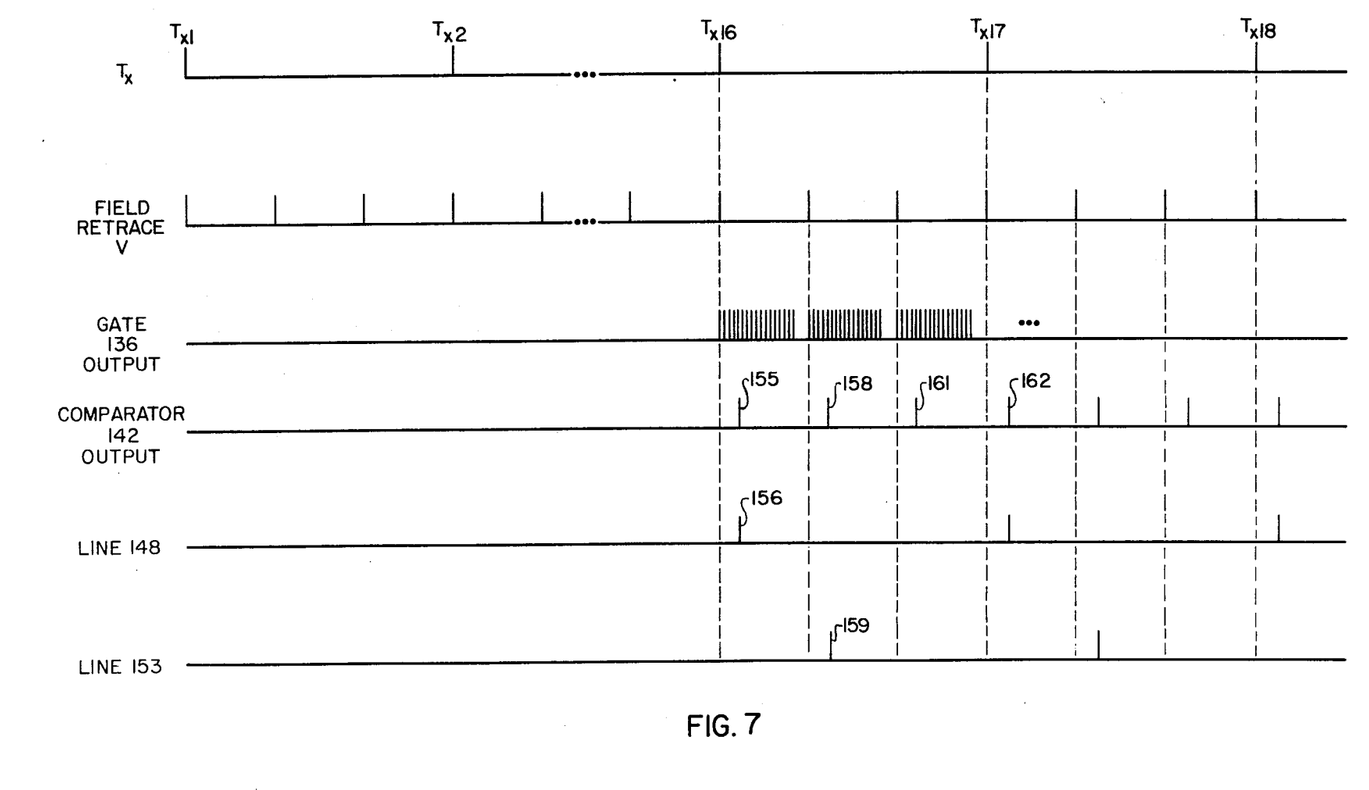

Upon the occurrence of $T_{x16}$, the number 16 from counter 130 is in comparator 142 and when 16 horizontal line signals have occurred, comparator 142 will provide a first output signal in the form of pulse 155. In response thereto, a counter and timing circuit 145 will produce a 63.5 microsecond pulse 156 on line 148.

Sixteen horizontal line pulses after the next vertical retrace, comparator 142 will provide an output pulse 158, which in response thereto, counter and timing circuit 145 will provide a 63.5 microsecond pulse on line 149 which is delayed by one-half TV line to appear as pulse 159 on line 153.

Although comparator circuit 142 provides a third pulse 161 between transmission $T_{x16}$ and $T_{x17}$, the counter and timing circuit 145 is designed to be non-responsive to it.

After $T_{x17}$, counter 130 provides the count of seventeen to comparator 142 and when 17 horizontal signals have been counted comparator 142 will provide an output pulse 162, and the process continues such that the first two comparator output pulses after transmission number and line number coincidence, will provide the proper width gating pulse or the video disc circuitry for writing the contents of S/R 3 or S/R 4 for assembly of the final picture. Since the active portion of the TV line is only approximately 53.5 microseconds, timing circuit 118 responds to the 63.5 microsecond input from lines 148 and 153 to essentially eliminate the first 10 microseconds for presentation and a 53.5 microsecond enabling pulse gates 111 and 112.

Figure 8:
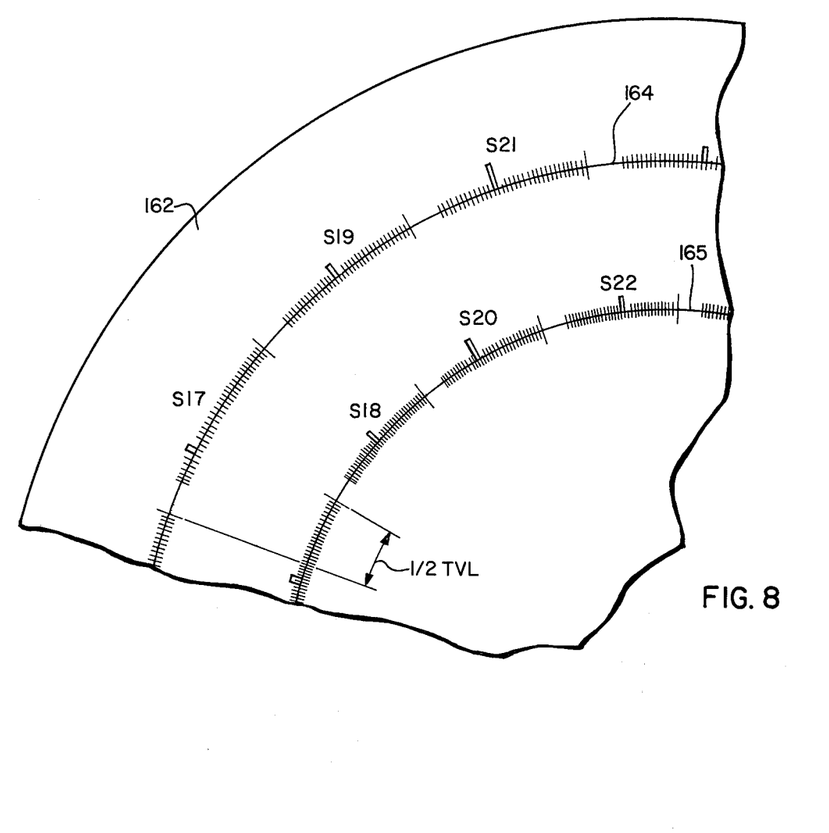
FIG. 8 illustrates a portion of a video disc.

With additional reference to FIG. 8, a portion of a typical 3600 rpm video disc 62 is illustrated with the odd and even field tracks 164 and 165. Each track contains adjacent slot locations S17 . . . etc., in which a TV line is recorded for display, with each slot representing 63.5 microseconds and with the first 10 seconds thereof being blank corresponding to horizontal retrace. The remainder of the slot location is in effect divided into 256 separate increments corresponding to 256 beam locations of the port-starboard sonar and if target coincidence is determined in one of those beams with a target in the B sonar beam, then the analog value of the target range may be written in at the proper location.

The slot locations in track 165 are displaced one-half TV line from those in track 164 as governed by the write command on line 153.

Since 16 lines of the display are taken up for the gray scale reference, 240 of the 256 signals will be displayed. However in order to fill up the entire display on the conventional TV monitor, e.g. 480 lines, each signal from S/R 3 or S/R 4 will be displayed twice, that is, one on the odd field and one on the even field. Accordingly, S/R 3 and S/R 4 recirculate their contents writing first on one track and then the other track of the video disc. This recirculation is accomplished with the provision of gates 170 and 171 which respectively receive the *a* and *b* outputs of toggle flip-flop 102 to enable one of the recirculating gates 173 or 174. Gate 176 is also under control of toggle flip-flop 102 to gate the appropriate register through to a digital to analog converter 180 where the read-out signal is converted to analog form for placement into storage on the video disc.

It will be seen that gates 170 and 171, enabling respective recirculating gates 173 and 174 also receive the output from timing circuit 118 so that the contents of S/R 3 or S/R 4 are recirculated in 53.5 microseconds.

Figure 9:
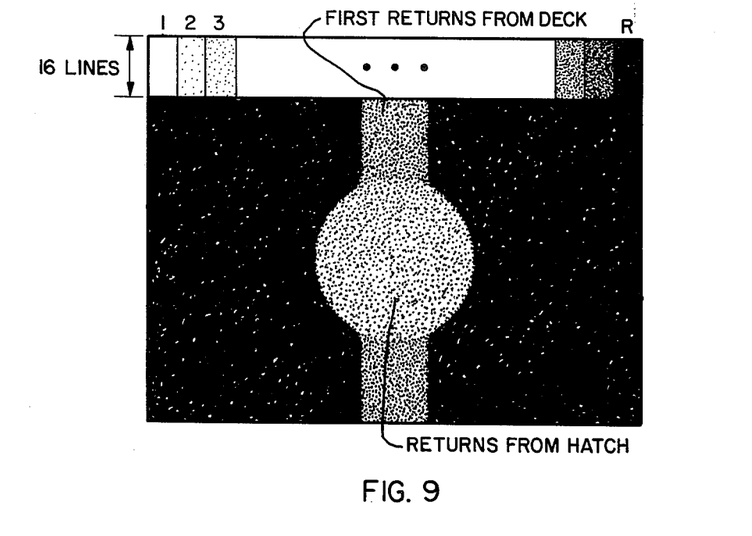
FIG. 9 illustrates a typical display.

FIG. 9 illustrates a typical picture on the TV monitor for the orientation of FIG. 2. The first 6 lines of the display are occupied by the gray scale reference ranging from white representing the closest range increment to black representing the Rth increment. As a feature of the present invention, the oscillator 70 (FIG. 5) providing the range increment indication, may be made to operate at various chosen frequencies corresponding to different width range increments. For instance, if 100 variations of gray would be too many to discern a particular target, the number of gradiations may be reduced to for example 16, and at a range of 125 feet each range increment will represent 7.8 feet, which may be satisfactory for initial target acquisition. Once closer to the actual target, the oscillator frequency may be changed such that the 16 range increments represent 1 foot, and at even closer ranges ½ foot, until visual contact with the target area can be made by means of underwater television apparatus.

What is claimed is:
1. A dual sonar display system comprising:
   A. sonar means for producing 1st and 2nd fan shaped beams and for scanning them in overlapping relationship in respective 1st and 2nd directions;
   B. said sonar means being operable to provide a 1st set of beam signals from said first beam, indicative of targets in respective adjacent beam positions and a 2nd set of beam signals from said 2nd beam, indicative of targets in respective adjacent beam positions;
   C. 1st storage means for storing target indications from said 1st set of beam signals;
   D. means for comparing each beam signal from said 2nd set with all the beam signals from said 1st set, for target coincidence;
   E. 2nd storage means for storing the results of said comparison;
   F. display means;
   G. 3rd storage means for storing signals for presentation on said display means; and
   H. means for transferring the contents of said 2nd storage means to said 3rd storage means for assembly of a complete picture to be displayed.
2. Apparatus according to claim 1 wherein 'A. one of said beam scans in a port to starboard direction and the other in a forward to aft direction, sequentially one after the other.
3. Apparatus according to claim 1 wherein
   A. said target indication is target range.
4. Apparatus according to claim 3 which includes
   A. means for displaying a gray scale reference on said display corresponding to predetermined range increments.
5. Apparatus according to claim 1 wherein
   A. said display is a TV monitor with a 2:1 interlaced picture and wherein
   B. the same data are written on both TV fields.
6. Apparatus according to claim 1 wherein
   A. said 1st storage means includes 1st and 2nd sections one alternately for receiving said 1st set of beam signals while the other alternately being used for comparison of a previously received 1st set of beam signals with said 2nd set of beam signals.
7. Apparatus according to claim 1 which includes
   A. an oscillator for providing an output signal corresponding to desired range increments;
   B. a counter responsive to output of said oscillator for providing a running count of said range increments;
   C. 1st gating means for passing the count of said counter to said 1st storage means, when enabled;
   D. said 1st gating means being enabled upon occurrence of a target indication above a predetermined threshold, from said 1st beam.
8. Apparatus according to claim 7 which includes
   A. 2nd gating means for passing the count of said counter to said means for comparing, when enabled;
   B. said 2nd gating means being enabled upon occurrence of a target indication above a predetermined threshold, from said 2nd beam.
9. Apparatus according to claim 7 wherein
   A. the frequency of said oscillator is variable so as to choose different range increments.
10. Apparatus according to claim 6 wherein
    A. said 1st and 2nd sections are recirculating shift registers.
11. Apparatus according to claim 1 wherein
    A. said 2nd storage means includes 1st and 2nd sections each for alternately receiving the results of said comparison and for transferring its contents to said 3rd storage means.
12. Apparatus according to claim 11 wherein
    A. said 1st and 2nd sections are recirculating shift registers.
13. Apparatus according to claim 1 wherein
    A. said 3rd storage means is a video disc.
14. Apparatus according to claim 1 wherein
    A. said display is a TV monitor; and
    B. the production of said beam signals is locked to the vertical retrace period of said TV monitor.

* * * * *